(12) United States Patent
Stanley et al.

(10) Patent No.: US 11,379,023 B2
(45) Date of Patent: Jul. 5, 2022

(54) REGULATING DEVICE SURFACE TEMPERATURE

(71) Applicant: Microsoft Technology Licensing, LLC, Redmond, WA (US)

(72) Inventors: Gavin Donald Stanley, Puyallup, WA (US); Sravan Kumar Reddy Gondipalli, Mercer Island, WA (US); Douglas Lea Heirich, Palo Alto, CA (US); Sridhar Canumalla, Sammamish, WA (US); Alfonsus Dibianto Lunardhi, San Ramon, CA (US); John Michael Link, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 338 days.

(21) Appl. No.: 16/512,262

(22) Filed: Jul. 15, 2019

(65) Prior Publication Data
US 2021/0018966 A1 Jan. 21, 2021

(51) Int. Cl.
*G05D 23/00* (2006.01)
*G06F 1/20* (2006.01)

(52) U.S. Cl.
CPC .............. *G06F 1/206* (2013.01); *G06F 1/203* (2013.01)

(58) Field of Classification Search
CPC ........ G06F 1/203; G06F 1/206; G06F 1/3203; G02B 2027/0178; G02B 27/0176;
(Continued)

(56) References Cited

U.S. PATENT DOCUMENTS

2007/0221656 A1* 9/2007 Reiter .................... H05B 3/746
219/494
2012/0271480 A1 10/2012 Anderson et al.
(Continued)

FOREIGN PATENT DOCUMENTS

WO 2017176432 A1 10/2017

OTHER PUBLICATIONS

"International Search Report and Written Opinion Issued in PCT Application No. PCT/US2020/033502", dated Aug. 27, 2020, 13 Pages.

*Primary Examiner* — Zhipeng Wang
(74) *Attorney, Agent, or Firm* — Alleman Hall Creasman & Tuttle LLP

(57) ABSTRACT

Examples are disclosed that relate to methods, computing devices, and head-mounted display (HMD) devices for regulating a surface temperature of a device. In one example, a method comprises determining the surface temperature of a surface of the device, determining an energy accumulator value indicating cumulative energy received by a user via the surface of the device, and using a dynamic temperature limit function to calculate a temperature limit as a function of the energy accumulator value. The method also comprises comparing the surface temperature to the temperature limit. When the surface temperature has not reached the temperature limit, the method comprises incrementing the energy accumulator value. When the surface temperature has reached the temperature limit, the method comprises initiating a thermal mitigation action to cool the surface.

20 Claims, 10 Drawing Sheets

(58) Field of Classification Search
CPC .... G03F 7/0045; G03F 7/0048; G03F 7/0085; G03F 7/0125; G03F 7/0226; G03F 7/0236; G03F 7/039; G03F 7/095; G03F 7/162; G03F 7/168; G03F 7/2006; G03F 7/322; G03F 7/38
See application file for complete search history.

(56) References Cited

U.S. PATENT DOCUMENTS

| | | |
|---|---|---|
| 2014/0006818 A1 | 1/2014 | Doshi et al. |
| 2014/0163765 A1* | 6/2014 | Jain .................. G06F 1/206 700/300 |
| 2014/0189404 A1* | 7/2014 | Sur ................... G06F 1/3209 713/323 |
| 2015/0261267 A1* | 9/2015 | Vadakkanmaruveedu ............... F28F 13/003 361/679.54 |
| 2017/0075397 A1* | 3/2017 | Saeidi ............... G06F 1/3234 |
| 2017/0083063 A1* | 3/2017 | Saeidi ............... G06F 1/206 |
| 2017/0220445 A1* | 8/2017 | Cunningham ...... G06F 11/3089 |
| 2017/0281010 A1* | 10/2017 | Saeidi ................ A61B 5/01 |
| 2018/0259985 A1* | 9/2018 | Im .................... G01K 13/00 |
| 2019/0094929 A1* | 3/2019 | Geekie ............. H04W 52/0274 |

\* cited by examiner

REGULATING DEVICE SURFACE TEMPERATURE

BACKGROUND

Electronic devices may produce heat during operation. Some devices, such as wearable computing devices or laptop computing devices, may have one or more surfaces that contact a user during operation. If not mitigated, excess heat generated by an electronic device may cause discomfort.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to methods, computing devices, and head-mounted display (HMD) devices for regulating a surface temperature of a device. In one example, a method comprises determining the surface temperature of a surface of the device, using an energy accumulator function to obtain an energy accumulator value indicating cumulative energy received by a user via the surface of the device, and using a dynamic temperature limit function to calculate a temperature limit as a function of the energy accumulator value. The surface temperature is compared to the temperature limit. When the surface temperature has not reached the temperature limit, the energy accumulator value is incremented. When the surface temperature has reached the temperature limit, a thermal mitigation action is initiated to cool the surface.

DETAILED DESCRIPTION

Electronic devices may produce excess heat during operation. Some devices, such as wearable computing devices or laptop computing devices, may have one or more surfaces that contact a user during operation. If not mitigated, excess heat generated by an electronic device may cause discomfort. To address this situation, some devices may utilize a predetermined, static temperature limit. When the device temperature is greater than the static temperature limit, the device may be deactivated or throttled to reduce heat generation.

In some examples, the static temperature limit may be set to a temperature at which long-term continuous contact with the user's skin may produce discomfort or injury, such as contact at 43° C. for 8 hours. However, in some use cases, such as during short-term heavy use, the temperature of the device may exceed such a temperature limit after a much shorter period of time. This may cause the device to shut down prematurely, well before a target user discomfort level is reached, and thereby provide a poor user experience.

Figure 4:
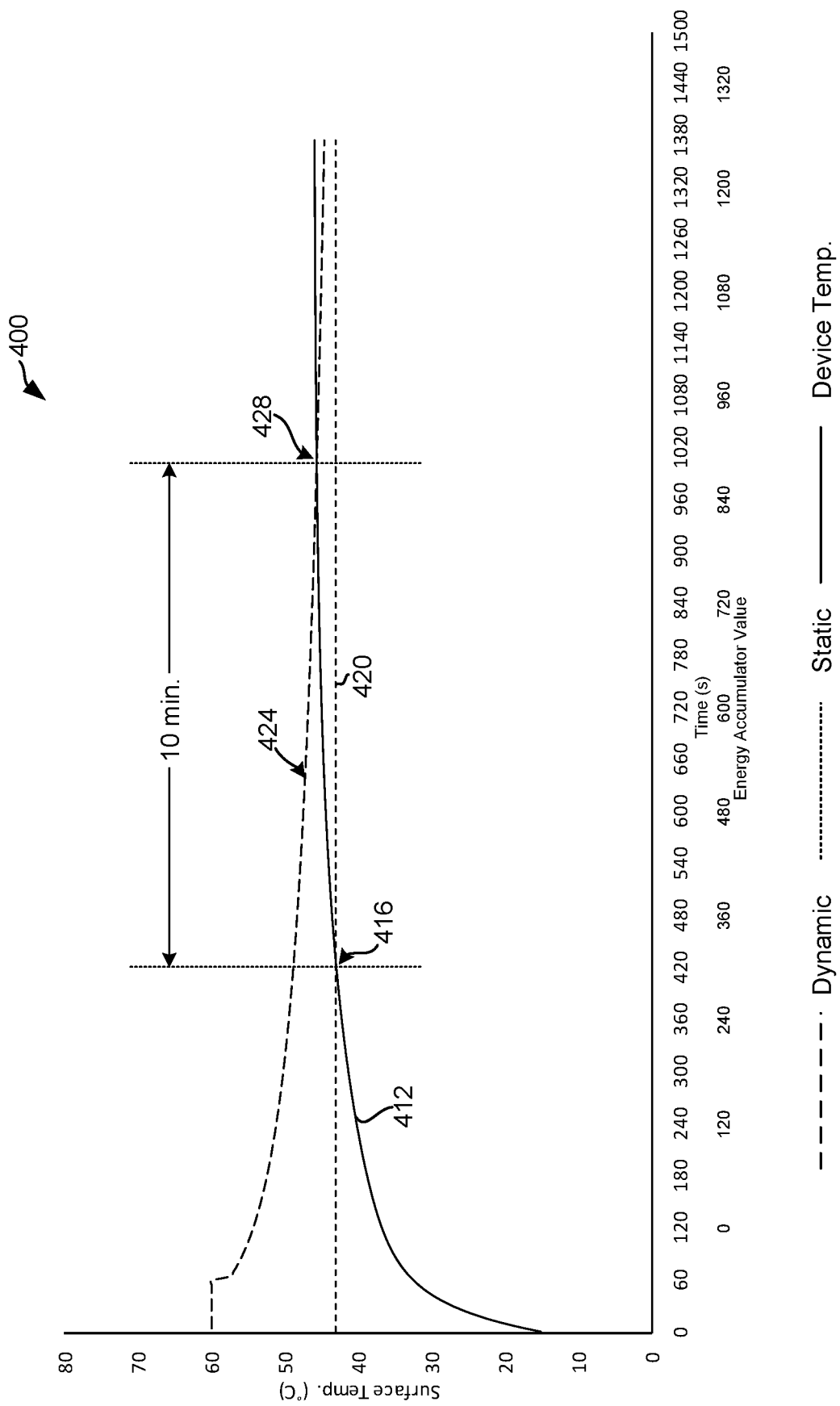
FIG. 4 shows a plot of a surface temperature of a device over time and a dynamic temperature limit function according to examples of the present disclosure.

For example, and with reference briefly to FIG. 4, one example of a plot 400 of a surface temperature of a device over time is provided. The solid line indicated at 412 represents the surface temperature of the device. In this example a static temperature limit 420 is set at 43° C. As noted, such a temperature limit may be selected based on a prolonged continuous contact with skin, such as for 8 hours. As indicated at 416, in this device the surface temperature 412 of the device reaches 43° C. within approximately 420 seconds/7 minutes. Accordingly, in these devices with a static temperature limit set at 43° C., the device will shut down or throttle its operations after only 7 minutes of operation.

However, when the device surface reaches 43° C., and depending upon a cumulative amount of energy (heat) present in the user's skin, a user may continue to comfortably operate the device at this temperature for a longer period, such as up to 8 hours, before experiencing undue discomfort. Further and in some use cases, the heat generated by the device may subsequently lessen and cause the surface to cool. Accordingly, throttling or shutting down the device upon the surface temperature reaching 43° C. may unnecessarily limit the user's operation and enjoyment of the device.

Accordingly, and in one potential advantage of the present disclosure, example methods and computing devices are disclosed that utilize a dynamic temperature limit function to periodically calculate a temperature limit as a function of an energy accumulator value. As described in more detail below, the energy accumulator value corresponds to an estimated cumulative energy received by a user via the surface of the device. In some examples, the energy accumulator value may be incremented or decremented based on comparing the surface temperature to a threshold temperature that is lower than the temperature limit.

When the surface temperature of the device has not reached the temperature limit, the energy accumulator value may be incremented. When the surface temperature reaches the temperature limit, a thermal mitigation action is initiated to cool the surface. In this manner, the temperature limit may change over time to account for the changing cumulative energy received by the user from the device surface. It follows that such a dynamic temperature limit function may more accurately reflect how much energy is received by the user. Further, by adjusting the temperature limit as a function of the estimated cumulative energy received by the user, the user may comfortably operate the device for longer periods of time.

Figure 1:
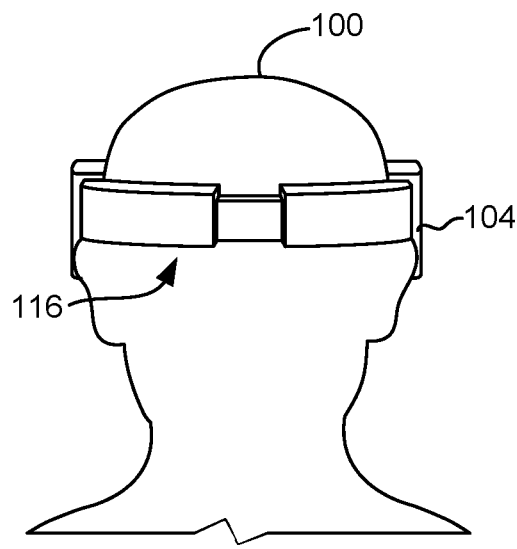
FIGS. 1 and 2 show an example of a user wearing a head-mounted display (HMD) device according to examples of the present disclosure.
Figure 2:
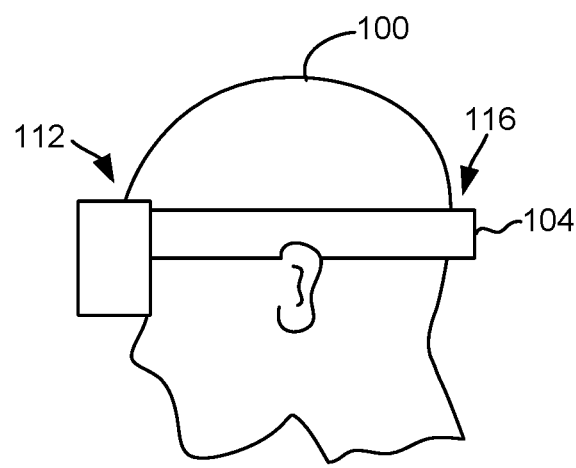

The methods described herein may be utilized by a variety of wearable and non-wearable devices, such as HMDs, wrist-worn devices, smart rings, electronic textiles/smart clothing, electronic fashion accessories, implanted devices, smartphones, laptop computers, etc. With reference now to FIGS. 1 and 2, in one example a user 100 may wear an HMD device 104. FIG. 1 shows a rear view of the user 100 and FIG. 2 shows a side view of the user 100. As described in more detail below with reference to FIG. 3, the HMD device 104 may include components that produce heat during operation, such as a processor, batteries, display system, etc. Excess heat generated by such components may be received by the user 100 via one or more surfaces of the HMD device 104 that directly or indirectly (such as through hair or clothing) contact the user's skin. For example, as shown in FIGS. 1 and 2, interior surfaces of the HMD device 104 may rest against the user's forehead as indicated at 112 and against a backside of the user's head at 116. In this example, excess heat generated by the HMD device 104 may be transferred to the user 100 via these surfaces.

Figure 3:
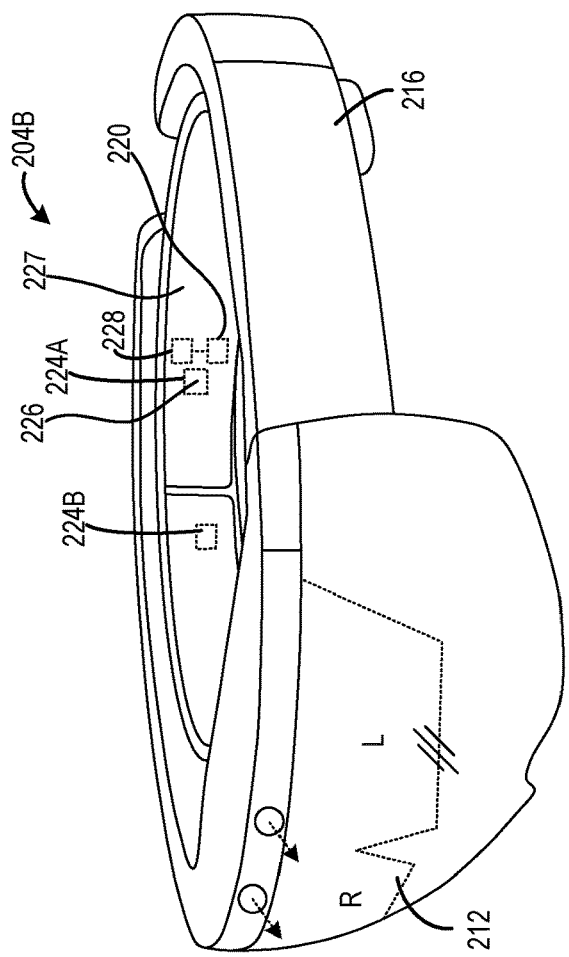
FIG. 3 shows two examples of head-mounted display (HMD) devices according to examples of the present disclosure.
Figure 3:
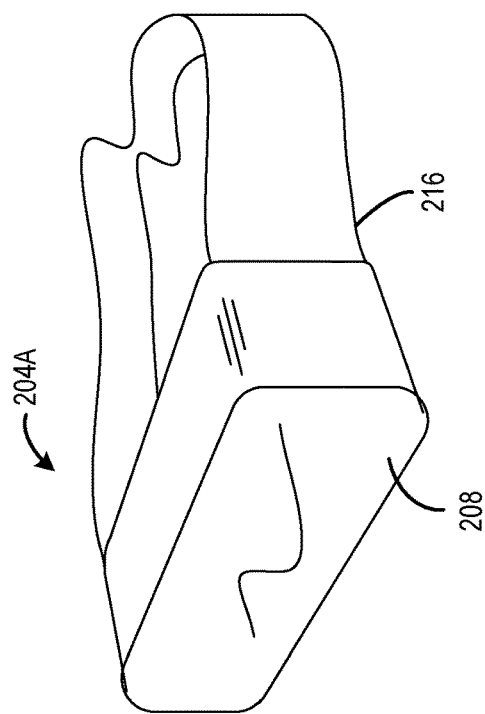

With reference now to FIG. 3, in one example, the HMD device 104 may take the form of a virtual reality HMD device 204A that includes an opaque, non-see-through display 208. In another example, the HMD device 104 may take the form of an augmented reality HMD device 204B that comprises an at least partially transparent display 212. It will be appreciated that the following descriptions of sensors, components and systems may apply to both the augmented reality HMD device 204B and the virtual reality HMD device 204A.

In the example of FIG. 3, each of the example HMD devices 204A and 204B has a construction that includes a frame 216 that wraps around the head of the user to position a display close to the user's eyes. The frame 216 of virtual reality HMD device 204A may include a rigid portion and an elastic portion whereas the frame 216 of augmented reality HMD device 204B may be substantially rigid around its circumference. The frame 216 of augmented reality HMD device 204B may support additional components such as, for example, a processor 220 and input devices 224A and 224B. In one example, input device 224A may be a thermocouple or other temperature sensor that may measure a surface temperature at a surface 226 of a rear band 227 that rests against the user's head. The processor 220 may include logic and associated computer memory 228 configured to operate the HMD device, receive sensor data from input device 224A and other sensors, and to enact the various methods and processes for regulating a surface temperature of a device described herein.

Various suitable display technologies and configurations may be used to display images via the displays of the HMD devices 204A and 204B. For example, in virtual reality HMD device 204A, the display 208 may be an opaque display, such as a non-see-through Light-Emitting Diode (LED) display, a Liquid Crystal Display (LCD), or any other suitable type of opaque or otherwise non-see-through display. In augmented reality HMD device 204B, the display 212 may be an at least partially transparent display that is configured to enable a wearer of the augmented reality HMD device 204B to view physical, real-world objects in the physical environment through one or more partially transparent pixels displaying virtual object representations. The processor 220 may include a logic processor and the two example HMD devices 204A and 204B may include volatile memory and non-volatile storage, as discussed in more detail below with respect to the example computing system 1000 of FIG. 10.

With reference now to FIGS. 4-9, example methods for regulating a surface temperature of a device utilizing a dynamic temperature limit function will now be described. As noted above, the methods of the present disclosure utilize a dynamic temperature limit function to provide a variable temperature limit that is based on an estimated cumulative energy received by the user from a device surface. As described in more detail below, the dynamic temperature limit function is utilized in conjunction with an energy accumulator that generates an energy accumulator value indicating an estimated cumulative energy received by a user via the surface of the device. In some examples, such estimated cumulative energy may also be adjusted based on determining whether the device surface is in contact with the user, and whether the surface temperature has reached a threshold temperature.

FIG. 4 shows one example of a dynamic temperature limit function 424 according to examples of the present disclosure. The lower x-axis values shown in FIG. 4 represent example energy accumulator values generated by an energy accumulator. In some examples and as described in more detail below, the energy accumulator may comprise a counter generating energy accumulator values that are incremented or decremented via one or more programmable functions or other logic. In some examples, the counter may comprise a timer and the energy accumulator values may correspond to time periods such as seconds. Additionally and as shown in the example of FIG. 4, the energy accumulator value may be incremented once the device surface temperature 412 reaches a threshold temperature, which in this example is 43° C. In other examples, the energy accumulator may start at any other suitable time (e.g. at 0 seconds).

In the example of FIG. 4, the values of the energy accumulator correspond to seconds. In other examples, the energy accumulator value may be a function of the device surface temperature 412 and/or one or more other factors. As observed in FIG. 4, as the value of the energy accumulator increases, the temperature limit corresponding to the intersection point on the dynamic temperature limit function 424 decreases. In this manner, the dynamic temperature limit function 424 reduces the temperature limit of the device surface as the cumulative energy received by the user via the surface increases.

As noted above, by adjusting the temperature limit as a function of an estimated cumulative energy received by the user, the user may comfortably operate a device for longer periods of time. In the example of FIG. 4, and in one example where the material contacting the user is plastic, as indicated at 428 the surface temperature 412 of the device crosses the dynamic temperature limit function 424 after approximately 1020 seconds (17 minutes), thereby allowing the device to operate for approximately an additional 10 minutes after the surface temperature of the device reaches 43° C. In this manner and compared to using a static temperature limit of 43° C., the dynamic temperature limit function affords a longer period in which the user may comfortably use the device. In other examples, the dynamic temperature limit function may afford additional periods of comfortable use longer or shorter than the example shown in FIG. 4.

Additionally and as shown in FIG. 4, the dynamic temperature limit function 424 also accommodates periods of device use at higher temperatures. In one example where the material contacting the user is plastic, in the example of FIG. 4 the dynamic temperature limit function 424 may allow the device to operate normally with a surface temperature of up to 60° C. at 60 seconds (1 minute) and 45° C. at 1020 seconds (17 minutes).

A dynamic temperature limit function may be generated or determined in any suitable manner, such as via empirical testing with actual users, by referencing related surface temperature/user comfort guidelines, using a combination of empirical data and guideline(s), etc. Any suitable function may be used, such as linear, polynomial, logarithmic or piecewise functions. In some examples, the dynamic temperature limit function may be linear or constant in one or more regions. For example, in the example of FIG. 4 the dynamic temperature limit function 424 may be a constant 60° C. from 0 to 60 seconds. Additional details regarding using a dynamic temperature limit function with an energy accumulator to regulate a surface temperature of a device are described in more detail with reference to FIG. 5.

Figure 5:
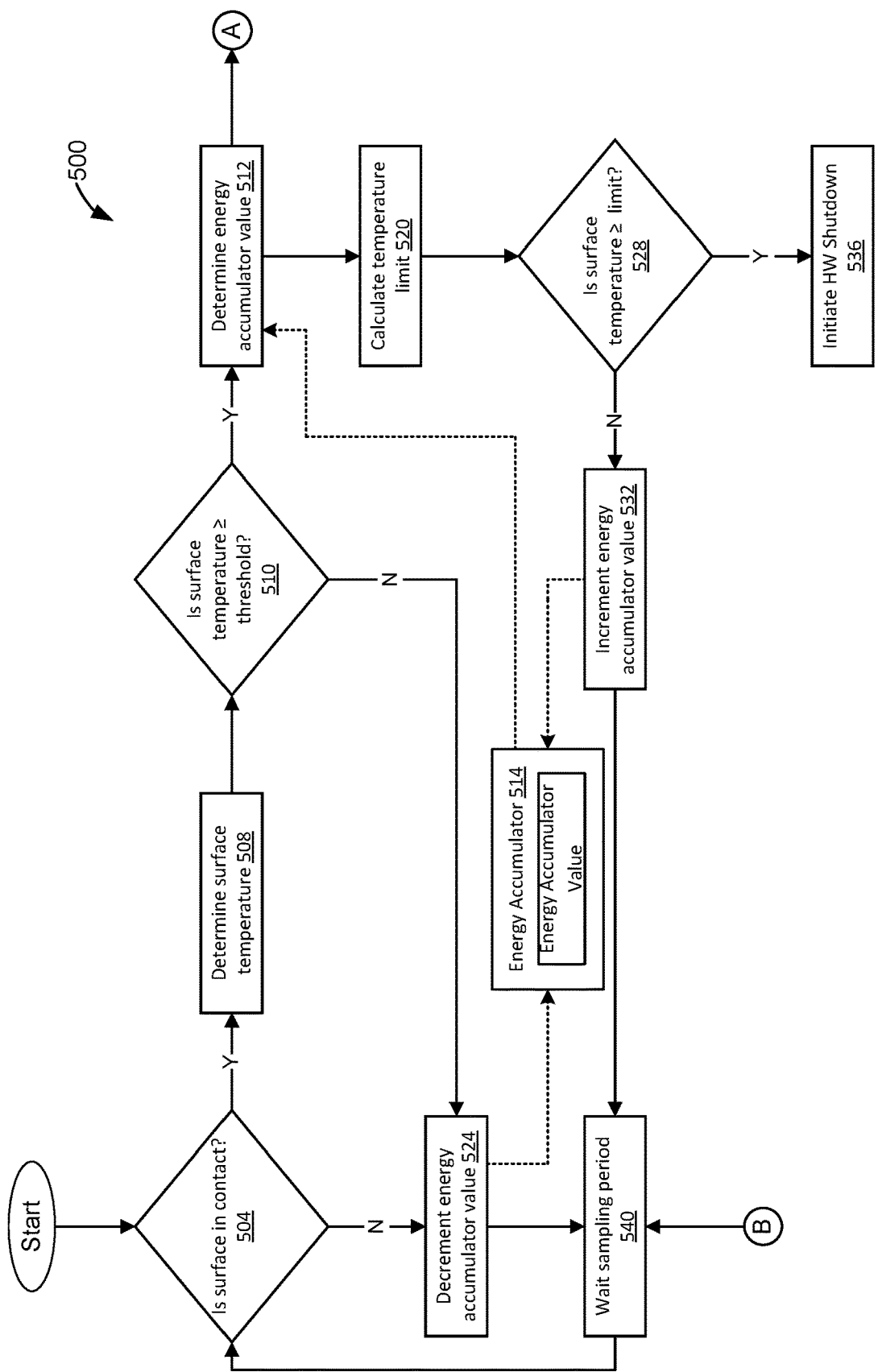
FIG. 5 is a block diagram illustrating an example method for regulating a surface temperature of a device according to examples of the present disclosure.

FIG. 5 illustrates a logic flow diagram of an example method 500 for using a dynamic temperature limit function and energy accumulator to regulate a surface temperature of a device. Method 500 may be performed, for example, by a processor of a device, such as the processor 220 of HMD device 204B in FIG. 3. At 504, the method 500 may include determining whether a surface of the device is in contact with a user. Contact may be determined in any suitable manner. In the example of HMD device 204B of FIG. 3, a presence sensor 224B such as an optical sensor may be used to determine that the user is wearing the HMD device. Based on determining that the user is wearing the HMD device, it may be inferred that surface 226 of the HMD device is in contact with the user. In other examples, the device may use any other suitable sensors for determining that the device is in contact with the user, such as a conductive contact sensor.

As described in more detail below, where the device surface is not in contact with the user, at 524 the method 500 includes decrementing the energy accumulator value. By decrementing the energy accumulator value, the estimated energy accumulated by the user beyond a threshold may be bled while contact with the surface is removed. In this manner, when the user re-dons the device, the energy accumulator value may be lower than the last time it was used.

Returning to 504, when it is determined that the surface of the device is in contact with the user, the method 500 proceeds to 508 to determine the surface temperature of a surface of the device. In other examples, step 504 may be omitted from the method 500, and the method 500 may start at step 508.

The surface temperature may approximate a temperature of a portion of the user's skin that is contacting the device surface. Accordingly, in other examples, step 508 may additionally or alternatively include determining the temperature of the user's skin. The surface temperature or the temperature of the user's skin may be determined in any suitable manner, such as using a thermocouple or other temperature sensor within the device or an infrared temperature sensor facing the user. In yet other examples, a measure of power consumption may be used to provide additional input or to approximate the surface temperature.

At 510, the method 500 may include determining if the surface temperature has reached a threshold temperature. In the example of FIG. 5, whether the surface temperature has reached a threshold temperature or a temperature limit is defined to mean whether the surface temperature is greater than or equal to the threshold temperature. In other examples of the present disclosure, whether the surface temperature has reached a threshold temperature or a temperature limit may defined as whether the surface temperature is greater the threshold temperature.

As described in more detail below, in some examples a threshold temperature may correspond to a temperature at which long-term continuous contact with skin will cause undue discomfort or injury. In other examples, a threshold temperature may be selected based on different criteria. In different examples and use cases, different threshold temperatures may be utilized, and may be selected based on the material of the device surface (metal, plastic, etc.), the expected rate of heat generation, and/or other factors. In the present example and with reference again to FIG. 4, a threshold temperature of 43° C. may be utilized. As illustrated in the example of FIG. 4, the dynamic temperature limit function 424 approaches the threshold temperature 420, and may eventually converge to the same temperature, as the duration of contact increases.

As noted above and described further below, when the device surface temperature is greater than or equal to the threshold temperature and the user is in contact with the device, the energy accumulator 514 may be incremented to reflect increasing energy received by the user from the surface. On the other hand, when the device surface temperature is below the temperature threshold (e.g. 43° C.), the energy accumulator may be decremented and the user may indefinitely wear the device without discomfort. In this manner, the energy accumulator 514 may function as a reservoir that reflects a cumulative amount of energy that has been received by the user of the device. In some examples and as noted above, the energy accumulator value may correspond to an amount of time the user is contacting the device over a single continuous period, or over multiple contact periods separated by gaps in time of non-contact with the device surface.

Returning to 510, when the surface temperature is less than the threshold temperature, at 524 the method 500 may include decrementing the energy accumulator value. In some examples, decrementing the energy accumulator value may comprise reducing the value by one unit when the current value is greater than zero. In other examples, where the current value is negative or a decimal between zero and 1, the energy accumulator may be reset to zero.

With reference again to FIG. 4, by incrementally decrementing the energy accumulator value when the surface temperature is less than the threshold temperature or the surface is not in contact with the user, the intersection point on the dynamic temperature limit curve 424 moves backward to thereby increase the maximum surface temperature limit. In one example use case scenario, a user may wear a device for 1020 seconds until the surface temperature 412 reaches the temperature limit at approximately 45° C. The user may then remove the device for 120 seconds. Accordingly, in one example the energy accumulator value may be walked back by 120 units from a value of 1020 units to a value of 900 units. In this manner, when the user puts the device back on after 900 seconds, the temperature limit may correspond to the value of the dynamic temperature limit function 424 at 900 units, or approximately 46° C.

It will also be appreciated that, in some examples, the energy accumulator value may be incremented or decremented by any other suitable amount. For example, the energy accumulator value may be incremented in multiples of 2 for each second the device is in contact with the user, or the energy accumulator value may be decremented in multiples of 0.5 for each second the device is below the temperature threshold. In some examples, the energy accumulator value may be incremented or decremented using a piecewise function. For example, the energy accumulator value may be incremented by 1 unit for each second the surface contacts the user when the surface temperature is between 43-44° C.; by 2 units for each second the surface temperature is between 44-46° C.; and by 3 units for each second the surface temperature is greater than 46° C.

In some examples, the energy accumulator value may be incremented or decremented in a manner not directly proportional to the contact time. For example, the energy accumulator value may be decremented using a different function than the dynamic temperature limit function 424. For example, the energy accumulator value may be decremented along a lower-temperature walkback curve that may be offset below and/or have a different slope than the dynamic temperature limit function 424. In this manner, the walkback curve may create hysteresis or a buffer to ensure that the temperature limit of the walkback curve is greater than the surface temperature of the device by at least a buffer range of temperature (e.g. 2° C.).

In other examples, rather than decrementing the energy accumulator value, an "off time" rest period may be imposed. The "off time" may comprise a predetermined static period, or the "off time" may vary as a function of the surface temperature and/or the energy accumulator value. In yet other examples, the energy accumulator and logic for incrementing/decrementing the accumulator may vary based on a device's form factor, materials, components, and/or other factors.

Returning to FIGS. 5 and 524, after decrementing the energy accumulator value, at 540 the method 500 may include waiting a sampling period. In different examples the sampling period may be 1 Hz., 2 Hz., or any suitable frequency. After the sampling period expires, the method 500 may return to 504 and determine if the surface of the device is in contact with the user.

Returning to 510, when the surface temperature is greater than or equal to the threshold temperature, at 512 the energy accumulator value is determined by obtaining the value from the energy accumulator 514. At 520, the method 500 uses a dynamic temperature limit function to calculate a temperature limit as a function of the energy accumulator value. The energy accumulator value may be provided as an input to an algorithm or look up table to determine the temperature limit. For example, and with reference again to FIG. 4, in this example when the energy accumulator value is 1020, the dynamic temperature limit function 424 may be utilized to obtain a temperature limit of approximately 45° C.

At 528, the method 500 then compares the surface temperature to the temperature limit. When the surface temperature is less than the temperature limit, at 532 the method 500 comprises incrementing the energy accumulator value. The method then continues to 540 to wait for the sampling period to expire.

When the surface temperature is greater than or equal to the temperature limit at 528, a thermal mitigation action is initiated to cool the surface. In the example of FIG. 5, at 536 the thermal mitigation action comprises initiating a hardware shutdown. Initiating the hardware shutdown may comprise powering down the device. Before powering down, the device may store information in memory to identify a proper temperature limit for the surface the next time the device is restarted.

As described in more detail below with reference to FIG. 6, in other examples the thermal mitigation action may comprise any suitable action configured to reduce the surface temperature of the device, such as activating active or passive cooling procedures or mechanisms. Additionally, such thermal mitigation actions may be triggered by one or more other dynamic temperature limit functions.

Figure 6:
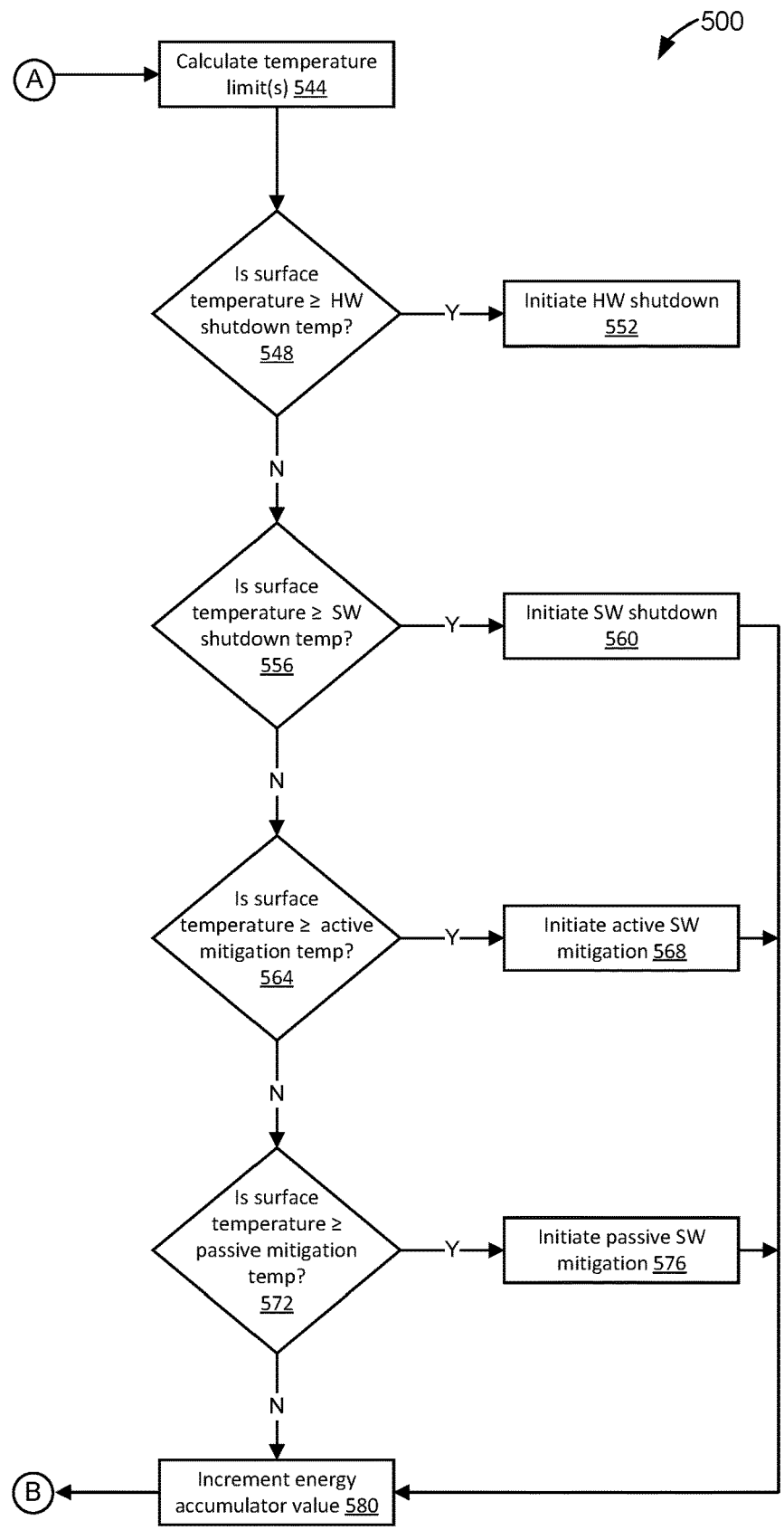
FIG. 6 is a block diagram illustrating examples of thermal mitigation actions according to examples of the present disclosure.

With reference now to FIG. 6, in some examples the method 500 may optionally include one or more thermal mitigation actions other than completely powering down the device. FIG. 6 is a partial flow diagram illustrating a plurality of examples of thermal mitigation actions. After determining the energy accumulator value at 512 in FIG. 5, at 544 in FIG. 6 the method 500 may optionally include calculating one or more different temperature limits by using corresponding different dynamic temperature limitation functions. As described in more detail below, each dynamic temperature limit function provides different thresholds for initiating different thermal mitigation actions.

As described above, in some examples, initiating a thermal mitigation action comprises initiating a hardware shutdown. Accordingly, in some examples, calculating the temperature limit(s) may comprise using a hardware shutdown temperature limit function to determine a hardware shutdown temperature. Returning to FIG. 6, at 548 the method 500 may include determining whether the surface temperature is greater than or equal to the hardware shutdown temperature. When the surface temperature is greater than or equal to the hardware shutdown temperature, at 552, the method 500 initiates a hardware shutdown of the device.

Figure 7:
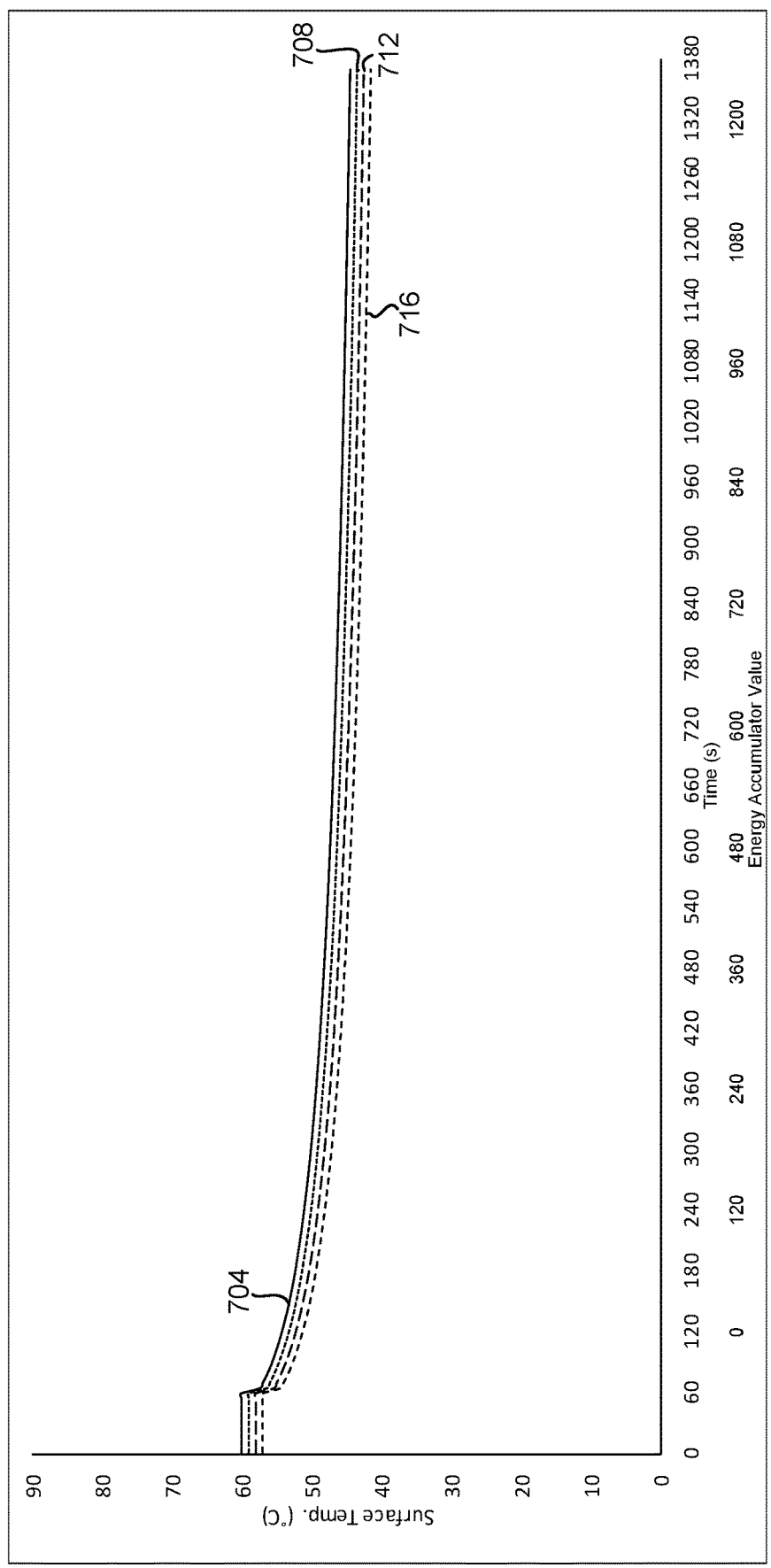
FIG. 7 shows an example plot of a plurality of different dynamic temperature limit functions according to examples of the present disclosure.

FIG. 7 shows one example of a hardware shutdown temperature limit function 704 that may be used to calculate the hardware shutdown temperature. As it may not be desirable to interrupt use of the device by performing a complete hardware shutdown, the hardware shutdown temperature limit function 704 may have a range of temperature limit values higher than other temperature limit functions illustrated in FIG. 7. In this manner and as described below, the device may take other less intrusive thermal mitigation actions at lower temperatures to cool the device surface before resorting to hardware shutdown.

In some examples, initiating the thermal mitigation action may include shutting down software running on the device. Accordingly, in some examples, calculating the temperature limit(s) may comprise using a software shutdown temperature limit function to determine a software shutdown temperature. FIG. 7 shows one example of a software shutdown temperature limit function 708, which has a lower range of temperatures than the hardware shutdown function 704, but is still higher than other temperature limit functions to avoid unnecessarily interrupting the user with a software shutdown.

As illustrated in FIG. 6, at 556, the method 500 may additionally or alternatively include determining whether the surface temperature is greater than or equal to a software shutdown temperature. When the surface temperature is greater than or equal to the software shutdown temperature, at 560, the method 500 may include initiating a software shutdown of software running on the device.

In some examples, initiating the thermal mitigation action may include performing software mitigation actions that may be controlled by the operating system. The software mitigation actions may comprise passive software mitigation, such as throttling the device or dynamically controlling system power, speed, frame rate, etc. The software mitigation may additionally or alternatively include active mitigation, such as disabling one or more features of one or more applications.

When initiating the thermal mitigation action includes conducting active software mitigation, calculating the temperature limit(s) may comprise using an active mitigation temperature limit function to determine an active mitigation temperature. FIG. 7 shows one example of an active mitigation temperature limit function 712. Accordingly and as illustrated in FIG. 6, at 564, the method 500 may additionally or alternatively include determining whether the surface temperature is greater than or equal to an active mitigation temperature. When the surface temperature is greater than or equal to the active mitigation temperature, at 568, the method 500 may include initiating an active software mitigation action.

In some examples, initiating the thermal mitigation action may additionally or alternatively include performing passive software mitigation actions. Accordingly, in some examples, calculating the temperature limit(s) may comprise using a passive mitigation temperature limit function to determine a passive mitigation temperature. FIG. 7 shows one example of a passive mitigation temperature limit function 716. As illustrated in FIG. 6, at 572, the method 500 may additionally or alternatively include determining whether the surface temperature is greater than or equal to a passive mitigation temperature. When the surface temperature is greater than or equal to the passive mitigation temperature, at 576, the method 500 may include initiating a passive software mitigation action.

In some examples, when the surface temperature is less than each of the software thermal mitigation temperature limits, at 580, the method 500 may include incrementing the energy accumulator value before waiting for the sampling period at 540 in FIG. 5 and then determining if the surface is in contact with the user at 504. Similarly, when one of the software shutdown, active software or passive software mitigation actions at 560, 568 or 576 is initiated, the method 500 also includes incrementing the energy accumulator value at 580, waiting for the sampling period at 540, and then determining if the surface is in contact with the user at 504.

It will be appreciated that each of the dynamic temperature limit functions may be independent of one another. One or more of the dynamic temperature limit functions may comprise different types of functions (linear, logarithmic, polynomial, etc.). For example, a hardware shutdown temperature limit function may be linear and/or constant, while a software shutdown temperature limit function, active mitigation temperature limit function, and/or passive mitigation temperature limit function may comprise other types of functions.

Figure 8:
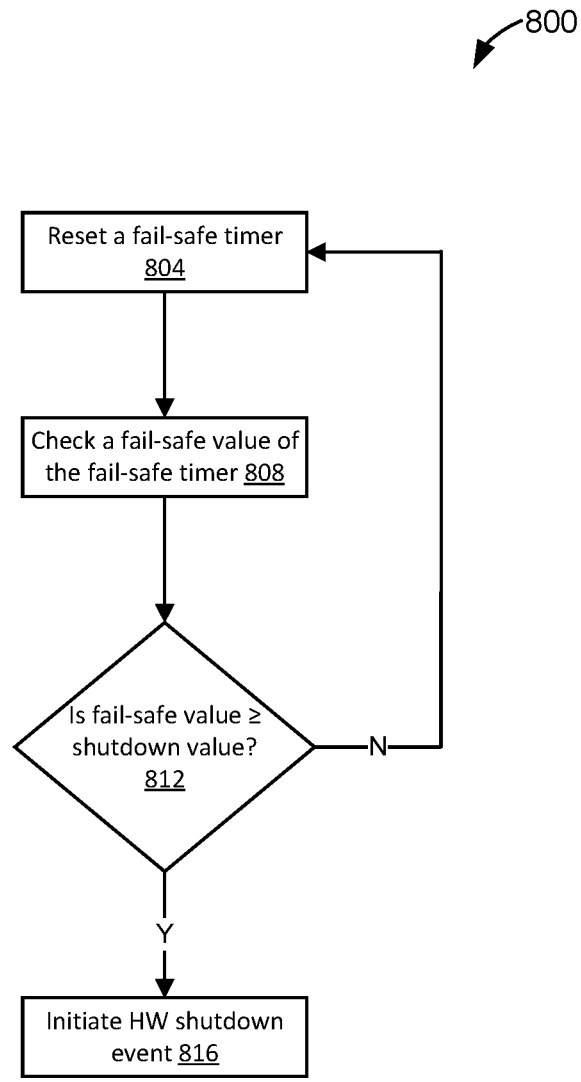
FIG. 8 shows a flow diagram illustrating one example of a fail-safe method for regulating a surface temperature of a device according to examples of the present disclosure.

With reference now to FIG. 8, in some examples, a fail-safe mechanism may also be implemented to ensure that the user remains comfortable in case the device malfunctions. FIG. 8 shows a flow diagram illustrating one example of a fail-safe method 800 for regulating the surface temperature of the device. In some examples, portions of the method 800 may be implemented at a hardware or firmware level within the device, such as in a logical state machine or microcontroller. In other examples, portions of the method 800 may be operated in software. Additionally, a portion of the method 800 may be implemented in and performed at least partially by the logic that performs method 500. For example, before determining if the surface is in contact with the user, the method 500 may include resetting a fail-safe timer as described below.

In some examples, the fail-safe method 800 may comprise, at 804, resetting a fail-safe timer to a starting value, such as zero. The fail-safe timer may be started when the device boots and configured to increment or decrement continuously until device shutdown. In some examples, the logic performing method 500 may be configured to reset the fail-safe timer to the starting value at predetermined intervals (e.g. once per 30 seconds, or prior to each determination of contact/no contact with the user).

At 808, the method 800 includes checking a fail-safe value of the fail-safe timer. In some examples, a separate software or hardware module that is not performing the method 500 may be configured to periodically check the value of the fail-safe timer at predetermined intervals (e.g. once per second). At 812, the method 800 comprises determining whether the fail-safe value of the fail-safe timer has reached a shutdown value, which would indicate that the resetting function of the logic of method 500 has failed. When the fail-safe value of the fail-safe timer has not reached a shutdown value, the method includes resetting the fail-safe timer at 804 after a sampling period.

When the fail-safe value of the fail-safe timer has reached the shutdown value, at 816, the method 800 includes initiating a hardware shutdown event. As one example, if software or hardware regulating the surface temperature of the device malfunctions or freezes, the fail-safe timer may not be reset. Accordingly, when enough time has elapsed for the fail-safe value of the fail-safe timer to reach the shutdown value, the device may be shut down to prevent the device from continuing to operate and the surface potentially reaching uncomfortable temperatures.

Figure 9A:
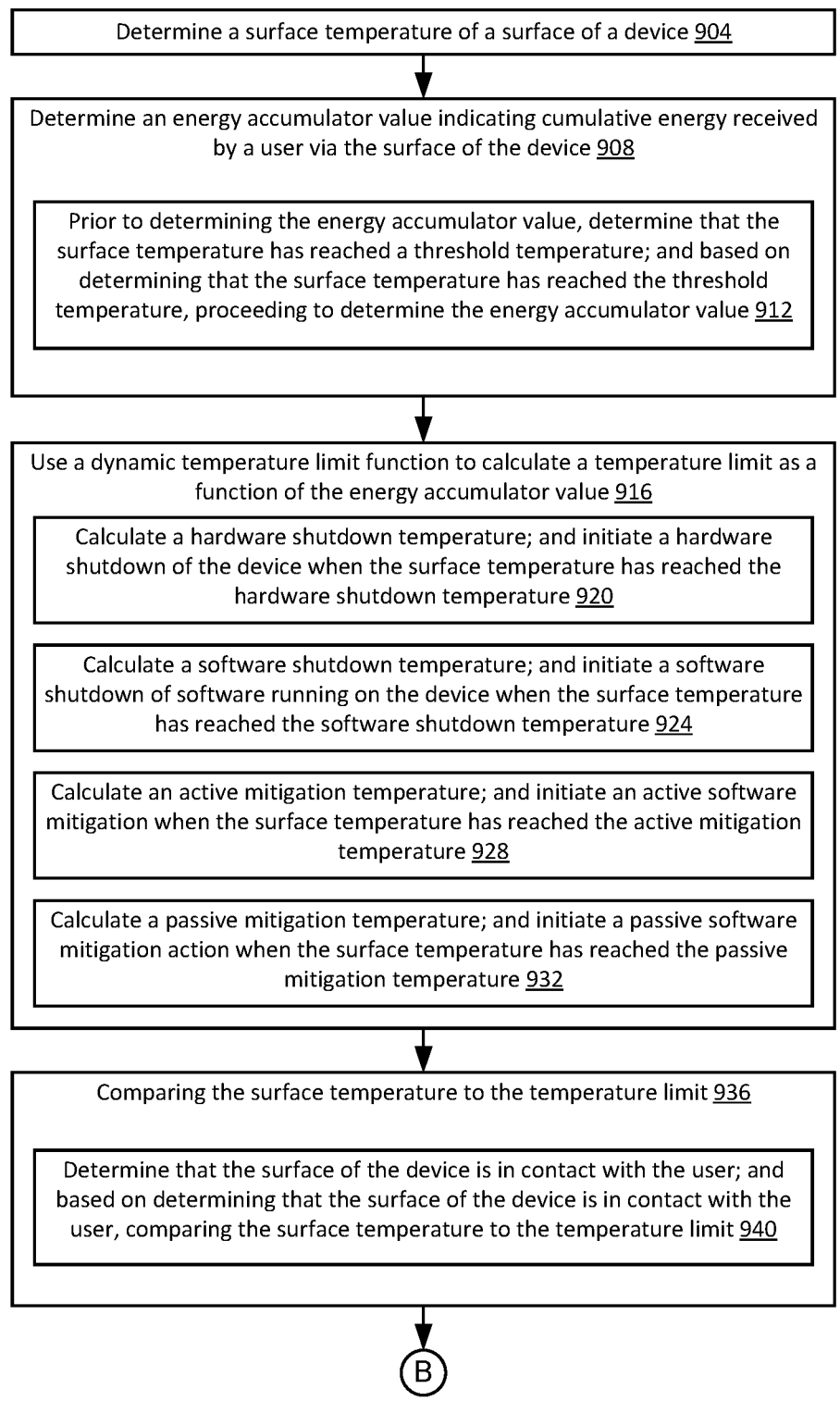
FIGS. 9A and 9B are a block diagram of a method for regulating a surface temperature of a device according to examples of the present disclosure.
Figure 9B:
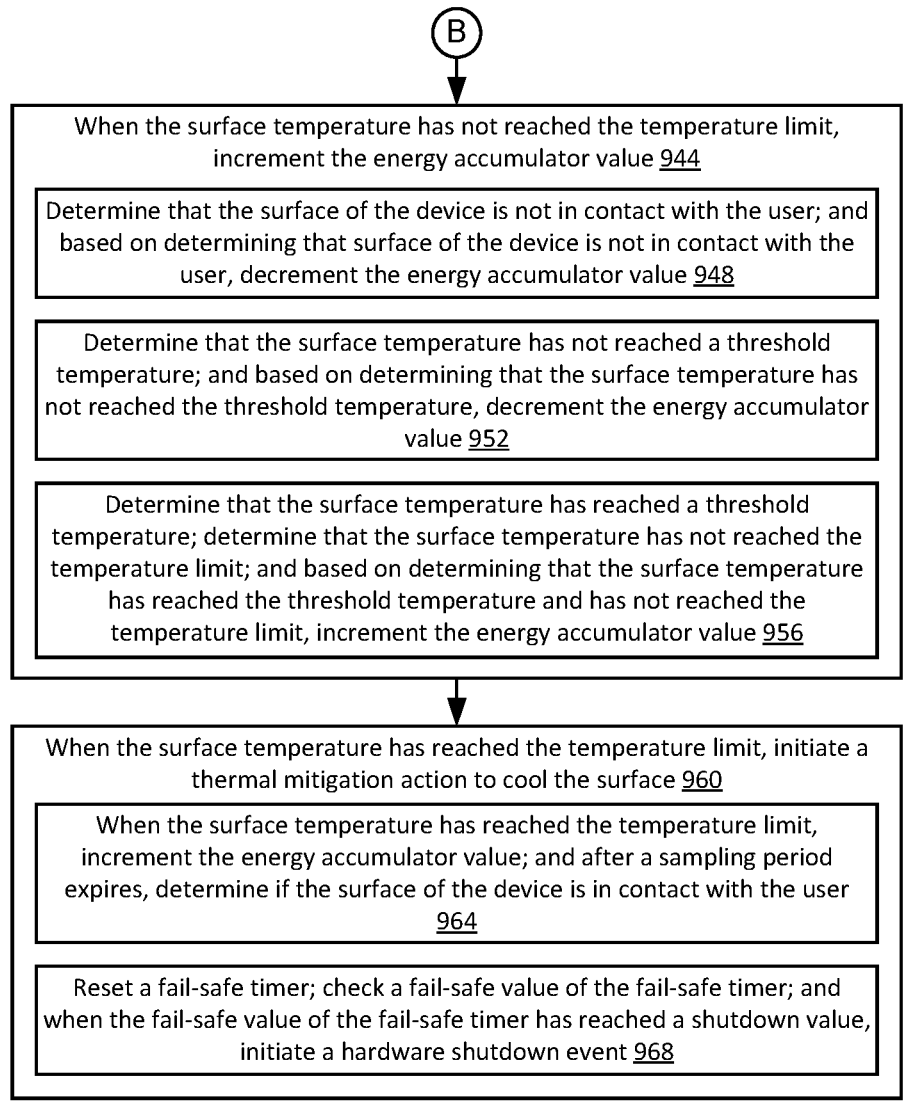

With reference now to FIGS. 9A and 9B, a flow diagram is provided depicting an example method 900 for regulating a surface temperature of a device. The following description of method 900 is provided with reference to the software and hardware components described herein and shown in FIGS. 1-8 and 10. It will be appreciated that method 900 also may be performed in other contexts using other suitable components.

With reference to FIG. 9A, at 904, the method 900 includes determining the surface temperature of a surface of the device. At 908, the method 900 includes determining an energy accumulator value indicating cumulative energy received by a user via the surface of the device. At 912, the method 900 may include, prior to determining the energy accumulator value, determining that the surface temperature has reached a threshold temperature; and based on determining that the surface temperature has reached the threshold temperature, proceeding to determine the energy accumulator value.

At 916, the method 900 includes using a dynamic temperature limit function to calculate a temperature limit as a function of the energy accumulator value. At 920, the method 900 may include, wherein calculating the temperature limit comprises calculating a hardware shutdown temperature; and wherein initiating a thermal mitigation action comprises initiating a hardware shutdown of the device when the surface temperature has reached the hardware shutdown temperature. At 924, the method 900 may include, wherein calculating the temperature limit further comprises calculating a software shutdown temperature; and wherein initiating a thermal mitigation action further comprises initiating a software shutdown of software running on the device when the surface temperature has reached the software shutdown temperature. At 928, the method 900 may include, wherein calculating the temperature limit further comprises calculating an active mitigation temperature; and wherein initiating a thermal mitigation action further comprises initiating an active software mitigation action when the surface temperature has reached the active mitigation temperature. At 932, the method 900 may include, wherein calculating the temperature limit further comprises calculating a passive mitigation temperature; and wherein initiating a thermal mitigation action further comprises initiating a passive software mitigation action when the surface temperature has reached the passive mitigation temperature.

At 936, the method 900 includes comparing the surface temperature to the temperature limit. At 940, the method 900 may include determining that the surface of the device is in contact with the user; and based on determining that the surface of the device is in contact with the user, comparing the surface temperature to the temperature limit.

With reference now to FIG. 9B, at 944, the method 900 includes when the surface temperature has not reached the temperature limit, incrementing the energy accumulator value. At 948, the method 900 may include determining that the surface of the device is not in contact with the user; and based on determining that surface of the device is not in contact with the user, decrementing the energy accumulator value. At 952, the method 900 may include determining that the surface temperature has not reached a threshold temperature; and based on determining that the surface temperature has not reached the threshold temperature, decrementing the energy accumulator value. At 956, the method 900 may include determining that the surface temperature has reached a threshold temperature; determining that the surface temperature has not reached the temperature limit; and based on determining that the surface temperature has reached the threshold temperature and has not reached the temperature limit, incrementing the energy accumulator value.

At 960, the method 900 includes, when the surface temperature has reached the temperature limit, initiating a thermal mitigation action to cool the surface. At 964, the method 900 may include when the surface temperature has reached the temperature limit, incrementing the energy accumulator value; and after a sampling period expires, determining if the surface of the device is in contact with the user. At 968, the method 900 may include resetting a fail-safe timer; checking a fail-safe value of the fail-safe timer; and when the fail-safe value of the fail-safe timer has reached a shutdown value, initiating a hardware shutdown event.

Figure 10:
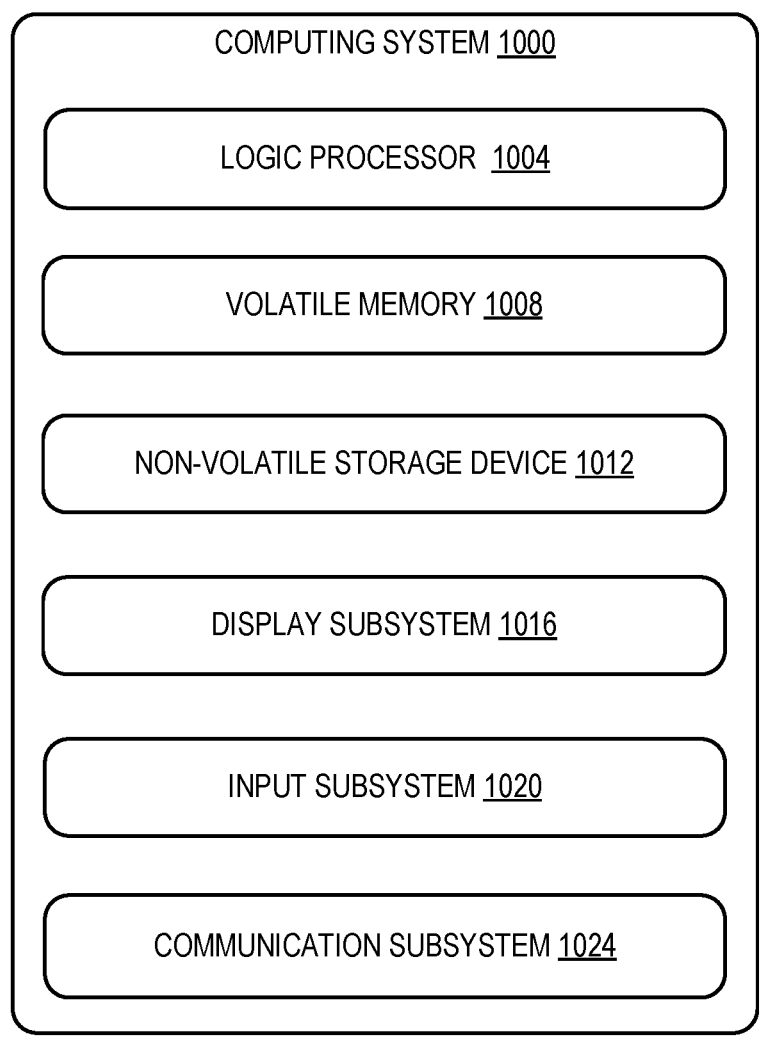
FIG. 10 is a block diagram showing an example computing system according to examples of the present disclosure.

FIG. 10 schematically shows a non-limiting embodiment of a computing system 1000 that can enact one or more of the methods and processes described above. Computing system 1000 is shown in simplified form. Computing system 1000 may take the form of one or more wearable devices, personal computers, server computers, tablet computers, home-entertainment computers, network computing devices, gaming devices, mobile computing devices, mobile communication devices (e.g., smart phone), and/or other computing devices. In the above examples, HMD devices 104, 204A and 204B may comprise computing system 1000 or one or more aspects of computing system 1000.

Computing system 1000 includes a logic processor 1004, volatile memory 1008, and a non-volatile storage device 1012. Computing system 1000 may optionally include a display subsystem 1016, input subsystem 1020, communication subsystem 1024, and/or other components not shown in FIG. 10. Logic processor 1004 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1004 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1004 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 1008 may include physical devices that include random access memory. Volatile memory 1008 is typically utilized by logic processor 1004 to temporarily store information during processing of software instructions. It will be appreciated that volatile memory 1008 typically does not continue to store instructions when power is cut to the volatile memory 1008.

Non-volatile storage device 1012 includes one or more physical devices configured to hold instructions executable by the logic processors to implement the methods and processes described herein. When such methods and processes are implemented, the state of non-volatile storage device 1012 may be transformed—e.g., to hold different data.

Non-volatile storage device 1012 may include physical devices that are removable and/or built-in. Non-volatile storage device 1012 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1012 may include nonvolatile, dynamic, static, read/write, read-only, sequential-access, location-addressable, file-addressable, and/or content-addressable devices. It will be appreciated that non-volatile storage device 1012 is configured to hold instructions even when power is cut to the non-volatile storage device 1012.

Aspects of logic processor 1004, volatile memory 1008, and non-volatile storage device 1012 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 1000 typically implemented in software by a processor to perform a particular function using portions of volatile memory, which function involves transformative processing that specially configures the processor to perform the function. Thus, a program or application may be instantiated via logic processor 1004 executing instructions held by non-volatile storage device 1012, using portions of volatile memory 1008. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1016 may be used to present a visual representation of data held by non-volatile storage device 1012. As the herein described methods and processes change the data held by the non-volatile storage device, and thus transform the state of the non-volatile storage device, the state of display subsystem 1016 may likewise be transformed to visually represent changes in the underlying data. Display subsystem 1016 may include one or more display devices utilizing virtually any type of technology. Such display devices may be combined with logic processor 1004, volatile memory 1008, and/or non-volatile storage device 1012 in a shared enclosure, or such display devices may be peripheral display devices.

When included, input subsystem 1020 may comprise or interface with the force-sensing elements described herein and/or one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1024 may be configured to communicatively couple various computing devices described herein with each other, and with other devices. Communication subsystem 1024 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1000 to send and/or receive messages to and/or from other devices via a network such as the Internet.

The following paragraphs provide additional support for the claims of the subject application. One aspect provides a method for regulating a surface temperature of a device, the method comprising: determining the surface temperature of a surface of the device; determining an energy accumulator value indicating cumulative energy received by a user via the surface of the device; using a dynamic temperature limit function to calculate a temperature limit as a function of the energy accumulator value; comparing the surface temperature to the temperature limit; when the surface temperature has not reached the temperature limit, incrementing the energy accumulator value; and when the surface temperature has reached the temperature limit, initiating a thermal mitigation action to cool the surface. The method may additionally or alternatively include determining that the surface of the device is in contact with the user; and based on determining that the surface of the device is in contact with the user, comparing the surface temperature to the temperature limit. The method may additionally or alternatively include determining that the surface of the device is not in contact with the user; and based on determining that the surface of the device is not in contact with the user, decrementing the energy accumulator value.

The method may additionally or alternatively include prior to determining the energy accumulator value, determining that the surface temperature has reached a threshold temperature; and based on determining that the surface temperature has reached the threshold temperature, proceeding to determine the energy accumulator value. The method may additionally or alternatively include determining that the surface temperature has not reached a threshold temperature; and based on determining that the surface temperature has not reached the threshold temperature, decrementing the energy accumulator value.

The method may additionally or alternatively include determining that the surface temperature has reached a threshold temperature; determining that the surface temperature has not reached the temperature limit; and based on determining that the surface temperature is has reached the threshold temperature and has not reached the temperature limit, incrementing the energy accumulator value. The method may additionally or alternatively include, when the surface temperature has reached the temperature limit, incrementing the energy accumulator value; and after a sampling period expires, determining if the surface of the device is in contact with the user.

The method may additionally or alternatively include, wherein calculating the temperature limit comprises calculating a hardware shutdown temperature; and wherein initiating the thermal mitigation action comprises initiating a hardware shutdown of the device when the surface temperature has reached the hardware shutdown temperature. The method may additionally or alternatively include, wherein calculating the temperature limit further comprises calculating a software shutdown temperature; and wherein initiating the thermal mitigation action further comprises initiating a software shutdown of software running on the device when the surface temperature has reached the software shutdown temperature.

The method may additionally or alternatively include, wherein calculating the temperature limit further comprises calculating an active mitigation temperature; and wherein initiating the thermal mitigation action further comprises initiating an active software mitigation action when the surface temperature has reached the active mitigation temperature. The method may additionally or alternatively include, wherein calculating the temperature limit further comprises calculating a passive mitigation temperature; and wherein initiating the thermal mitigation action further comprises initiating a passive software mitigation action when the surface temperature has reached the passive mitigation temperature. The method may additionally or alternatively include resetting a fail-safe timer; checking a fail-safe value of the fail-safe timer; and when the fail-safe value of the fail-safe timer has reached a shutdown value, initiating a hardware shutdown event.

Another aspect provides a computing device, comprising: a surface; a processor; and a memory storing instructions executable by the processor to: determine a surface temperature of the surface; determine an energy accumulator value indicating cumulative energy received by a user via the surface; use a dynamic temperature limit function to calculate a temperature limit as a function of the energy accumulator value; determine whether the surface temperature has reached the temperature limit; when the surface temperature has not reached the temperature limit, increment the energy accumulator value; and when the surface temperature has reached the temperature limit, initiate a thermal mitigation action to cool the surface. The computing device may additionally or alternatively include, wherein the instructions are further executable to: determine that the surface is in contact with the user; and based on determining that the surface is in contact with the user, determine whether the surface temperature has reached the temperature limit. The computing device may additionally or alternatively include, wherein the instructions are further executable to: determine that the surface is not in contact with the user; and based on determining that the surface is not in contact with the user, decrement the energy accumulator value.

The computing device may additionally or alternatively include, wherein the instructions are further executable to: prior to determining the energy accumulator value, determine that the surface temperature has reached a threshold temperature; and based on determining that the surface temperature has reached the threshold temperature, proceeding to determine the energy accumulator value. The computing device may additionally or alternatively include, wherein the instructions are further executable to: determine that the surface temperature has not reached a threshold temperature; and based on determining that the surface temperature has not reached the threshold temperature, decrement the energy accumulator value.

The computing device may additionally or alternatively include, wherein the instructions are further executable to: determine that the surface temperature has reached a threshold temperature; determine that the surface temperature has not reached the temperature limit; and based on determining that the surface temperature has reached the threshold temperature and has not reached the temperature limit, increment the energy accumulator value. The computing device may additionally or alternatively include, wherein the instructions are further executable to: when the surface temperature has reached the temperature limit, increment the energy accumulator value; and after a sampling period expires, determine if the surface of the device is in contact with the user.

Another aspect provides a head-mounted display (HMD) device, comprising: a display; a surface; a processor; and memory storing instructions executable by the processor to: determine a surface temperature of the surface; determine an energy accumulator value indicating cumulative energy received by a user via the surface; use a dynamic temperature limit function to calculate a temperature limit as a function of the energy accumulator value; determine whether the surface temperature has reached the temperature limit; when the surface temperature has not reached the temperature limit, increment the energy accumulator value; and when the surface temperature has reached the temperature limit, initiate a thermal mitigation action to cool the surface.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for regulating a surface temperature of a device estimating a cumulative energy received by a user via a surface of the device, the method comprising:
    determining the surface temperature of the surface of the device;
    determining an energy accumulator value indicating the cumulative energy received by the user via the surface of the device, wherein the energy accumulator value is adjusted based at least in part on determining whether the device surface is in contact with the user;
    using a dynamic temperature limit function to calculate a temperature limit as a function of the energy accumulator value;
    comparing the surface temperature to the temperature limit;
    when the surface temperature has not reached the temperature limit, incrementing the energy accumulator value; and
    when the surface temperature has reached the temperature limit, initiating a thermal mitigation action to cool the surface.

2. The method of claim 1, further comprising:
    determining that the surface of the device is in contact with the user; and
    based on determining that the surface of the device is in contact with the user, comparing the surface temperature to the temperature limit.

3. The method of claim 1, further comprising:
    determining that the surface of the device is not in contact with the user; and
    based on determining that the surface of the device is not in contact with the user, decrementing the energy accumulator value.

4. The method of claim 1, further comprising:
    prior to determining the energy accumulator value, determining that the surface temperature has reached a threshold temperature; and
    based on determining that the surface temperature has reached the threshold temperature, proceeding to determine the energy accumulator value.

5. The method of claim 1, further comprising:
    determining that the surface temperature has not reached a threshold temperature; and
    based on determining that the surface temperature has not reached the threshold temperature, decrementing the energy accumulator value.

6. The method of claim 1, further comprising:
determining that the surface temperature has reached a threshold temperature;
determining that the surface temperature has not reached the temperature limit; and
based on determining that the surface temperature is has reached the threshold temperature and has not reached the temperature limit, incrementing the energy accumulator value.

7. The method of claim 1, further comprising:
when the surface temperature has reached the temperature limit, incrementing the energy accumulator value; and
after a sampling period expires, determining if the surface of the device is in contact with the user.

8. The method of claim 1, wherein calculating the temperature limit comprises calculating a hardware shutdown temperature; and
wherein initiating the thermal mitigation action comprises initiating a hardware shutdown of the device when the surface temperature has reached the hardware shutdown temperature.

9. The method of claim 8, wherein calculating the temperature limit further comprises calculating a software shutdown temperature; and
wherein initiating the thermal mitigation action further comprises initiating a software shutdown of software running on the device when the surface temperature has reached the software shutdown temperature.

10. The method of claim 9, wherein calculating the temperature limit further comprises calculating an active mitigation temperature; and
wherein initiating the thermal mitigation action further comprises initiating an active software mitigation action when the surface temperature has reached the active mitigation temperature.

11. The method of claim 10, wherein calculating the temperature limit further comprises calculating a passive mitigation temperature; and
wherein initiating the thermal mitigation action further comprises initiating a passive software mitigation action when the surface temperature has reached the passive mitigation temperature.

12. The method of claim 1, further comprising:
resetting a fail-safe timer;
checking a fail-safe value of the fail-safe timer; and
when the fail-safe value of the fail-safe timer has reached a shutdown value, initiating a hardware shutdown event.

13. A computing device, comprising:
a surface;
a processor; and
a memory storing instructions executable by the processor to:
determine a surface temperature of the surface;
determine an energy accumulator value indicating cumulative energy received by a user via the surface, wherein the energy accumulator value is adjusted based at least in part on determining whether the device surface is in contact with the user;
use a dynamic temperature limit function to calculate a temperature limit as a function of the energy accumulator value;
determine whether the surface temperature has reached the temperature limit;
when the surface temperature has not reached the temperature limit, increment the energy accumulator value; and
when the surface temperature has reached the temperature limit, initiate a thermal mitigation action to cool the surface.

14. The computing device of claim 13, wherein the instructions are further executable to:
determine that the surface is in contact with the user; and
based on determining that the surface is in contact with the user, determine whether the surface temperature has reached the temperature limit.

15. The computing device of claim 13, wherein the instructions are further executable to:
determine that the surface is not in contact with the user; and
based on determining that the surface is not in contact with the user, decrement the energy accumulator value.

16. The computing device of claim 13, wherein the instructions are further executable to:
prior to determining the energy accumulator value, determine that the surface temperature has reached a threshold temperature; and
based on determining that the surface temperature has reached the threshold temperature, proceeding to determine the energy accumulator value.

17. The computing device of claim 13, wherein the instructions are further executable to:
determine that the surface temperature has not reached a threshold temperature; and
based on determining that the surface temperature has not reached the threshold temperature, decrement the energy accumulator value.

18. The computing device of claim 13, wherein the instructions are further executable to:
determine that the surface temperature has reached a threshold temperature;
determine that the surface temperature has not reached the temperature limit; and
based on determining that the surface temperature has reached the threshold temperature and has not reached the temperature limit, increment the energy accumulator value.

19. The computing device of claim 13, wherein the instructions are further executable to:
when the surface temperature has reached the temperature limit, increment the energy accumulator value; and
after a sampling period expires, determine if the surface of the device is in contact with the user.

20. A head-mounted display (HMD) device, comprising:
a display;
a surface;
a processor; and
a memory storing instructions executable by the processor to:
determine a surface temperature of the surface;
determine an energy accumulator value indicating cumulative energy received by a user via the surface, wherein the energy accumulator value is adjusted based at least in part on determining whether the device surface is in contact with the user;
use a dynamic temperature limit function to calculate a temperature limit as a function of the energy accumulator value;
determine whether the surface temperature has reached the temperature limit;
when the surface temperature has not reached the temperature limit, increment the energy accumulator value; and when the surface temperature has reached the temperature limit, initiate a thermal mitigation action to cool the surface.

* * * * *